Figure 1:
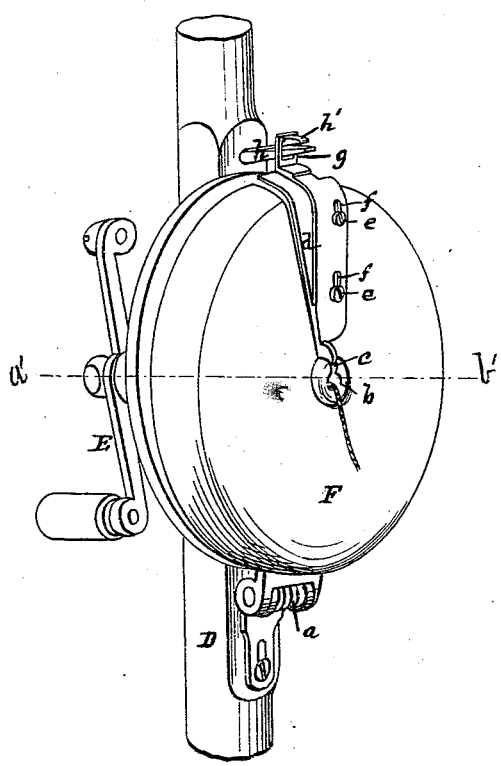

T. WINANS & T. D. WHISTLER.
Fishing-Reel.

No. 161,314.

Patented March 23, 1875.

Witnesses:
Ewell a. Dick.
Joseph C. Wildman

Inventors:
Thomas Winans and T. D. Whistler
by Pollok & Bailey their attys.

THE GRAPHIC CO. PHOTO.-LITH. 39 & 41 PARK PLACE, N.Y.

UNITED STATES PATENT OFFICE.

THOMAS WINANS AND THOMAS D. WHISTLER, OF BALTIMORE, MD.

IMPROVEMENT IN FISHING-REELS.

Specification forming part of Letters Patent No. 161,314, dated March 23, 1875; application filed February 27, 1875.

*To all whom it may concern:*

Be it known that we, THOMAS WINANS and THOMAS DELANO WHISTLER, both of Baltimore, Maryland, have invented certain new and useful Improvements in Fishing-Reels, of which the following is a specification:

In these improvements in fishing-reels it has been our principal object to prevent the line from overrunning at the time the cast is made. The liability of the line to overrun at this time is well known to fishermen. With the style of reel heretofore used the overrunning of the line when making the cast is very great if the reel be left free, and to prevent this overrunning it is necessary to regulate the rotation of the reel by a friction-brake of some kind. This operation of course requires the greatest amount of delicacy and experience, and even then there is great difficulty of preventing overrunning.

To accomplish the object we have in view we combine with the reel a guide or line eye, placed by the side of and on the prolongation of the axis of the reel. The line, passing over the side of the reel and through this eye, can run freely from the reel without revolving the latter when the cast is made. The line-eye is combined with or forms part of a cover or case which incloses the part of the reel that contains the line, and prevents, when the cast is made, the line being thrown out by centrifugal force.

The arrangement above indicated is adapted for use in casting. After the cast is made it is desirable that the line should run from the reel in the ordinary way. To this end we provide an opening or slit extending from the periphery of the cover into the eye, through which slit the line can, at pleasure, be passed into or removed from the eye. Other arrangements can, however, be employed for this purpose. The cover and eye can, for instance, be stationary or fixed in a position at right angles with the pole, and the reel may be mounted on an axis or pivot so located that said reel can be swung out to enter the case or cover, in which case it will, like the cover, stand at right angles to the pole, and will be in the required position for casting; or it may be swung back from the cover, so as to be parallel with the pole, in which case the eye will be nearly in line with the periphery of the reel, the parts thus being in the position required for their use after the cast has been made. Under this last indicated arrangement the eye requires no lateral slit, and the line will permanently pass through it.

The above and other features of our invention will be understood by reference to the accompanying drawing, in which—

Figure 2:
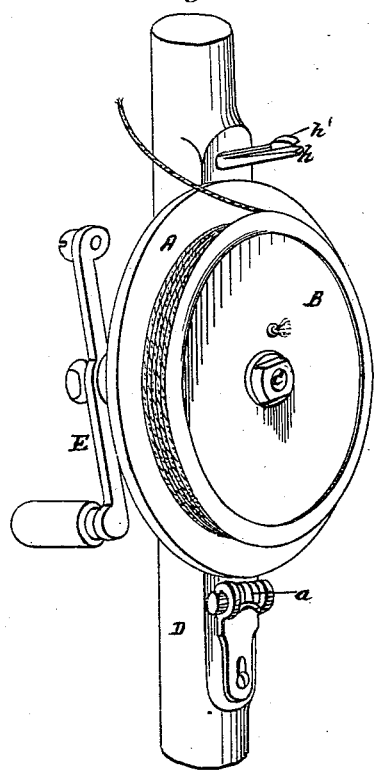
Figure 3:
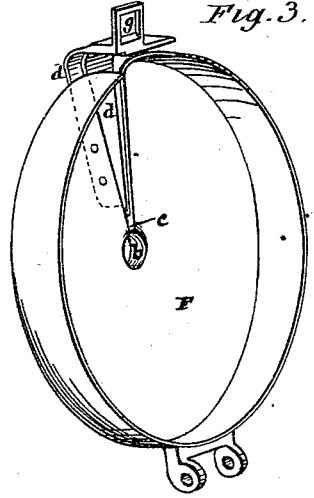
Figure 4:
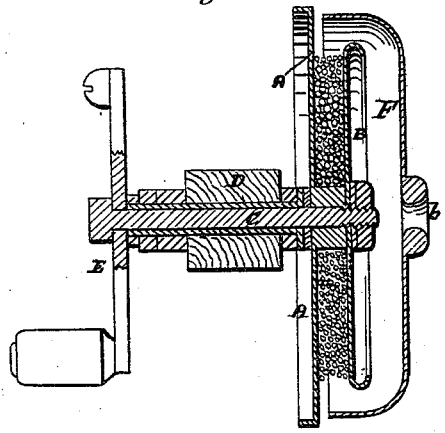

Figure 1 is a perspective view of a reel embodying our improvements. Fig. 2 is a view of the same, with the cover removed. Fig. 3 is a view of the inside of the cover. Fig. 4 is a transverse vertical section of the apparatus on line $a'$ $b'$, Fig. 1.

The reel proper in this instance consists of two disks, A B, fixed at a suitable interval apart on a central shaft, C, which has its bearings in the pole D, and on the end opposite that on which the reel is mounted has a crank-handle, E. By thus attaching the reel to the butt of the pole, by passing its axial shaft through the butt instead of attaching the reel to the butt by frame and rings, we effect a saving in cost of construction, and reduce the weight of the reel apparatus. The line is wound up and contained in the space between the two disks. The disk A next to the pole is of greater diameter than the other disk B. The latter has its periphery rounded or of convex form to permit the line to run freely over it to the eye, as hereinafter described.

It will be observed that the reel is noticeably narrow, the line-receiving part of the reel being narrow and deep instead of broad and shallow, as in ordinary reels. This construction is advantageous, in that in winding up it is unnecessary to guide the line with the fingers in order to distribute it evenly from side to side of the reel.

Combined with the reel proper is a hinged cover, F, which opens and shuts in the direction of the length of the pole. The hinge is, preferably, in rear of the reel, as shown. This cover, by the pressure of the thumb, can be pressed up against the larger disk A, so as to completely inclose the part of the reel containing the line, but it is normally held in position away from the disk A by a spring, $a$, on the hinge.

In the center of the cover, and opposite, or nearly opposite, to the center or axis of the reel, is an eye, $b$. Access can be had to this eye through an opening, c, which extends from the circumference of the cover to the eye, as shown, which opening is of tapering or wedge form, and is closed by means of a wedge-shaped slide, d, which, when raised, opens the passage c, and, when depressed, closes said passage.

The raising and depressing of this slide d is effected in the present instance by connecting it to the cover by set-screws or studs e fast to the cover, and passing through slots f in the slide. The upper end of the slide has a loop, g, which encircles an arm, h, projecting from the pole, and inclined outwardly and away from the reel. The cover being, by the action of the spring-hinge, held normally away from the reel, the loop will normally encircle the inclined arm at a point where it is farthest removed from the reel, in which position the slide will be raised and the passage c open. But when the cover is pressed to and closed against the reel, the loop will slide down onto the part of the inclined arm nearest the reel; consequently the slide will be depressed, and the passage c will be closed. The arm h, for convenience sake, is made in two parts, its upper face being formed of a spring retaining-hook, h', which serves to hold the loop on the arm, but can be depressed to allow the loop to be removed entirely from the arm whenever it may be desired—for instance, to throw the cover entirely back.

In using the reel, the line, before the cast is made, is drawn through the passage c, into the eye. The cover is then pressed to and closed, by which operation the passage c is entirely closed. With the parts in this position the cast is made, and the line runs with the utmost freedom over the edge of the outer disk B, and through the eye without rotating the reel proper. Indeed, if there were any such tendency to rotation it would be checked by the pressure of the cover against the reel. It will be seen that during this operation the portion of the reel containing the line is completely enveloped and inclosed, so that there is absolutely no danger of the entanglement, or knotting, or winding up of the line, which so frequently occurs in using ordinary reels. When the cast is made, the thumb is removed from the cover, which at once recedes from the reel, opening the passage c, out through which the line passes, and is thenceforward entirely independent of the cover and eye, and is controlled by the movement of the reel in the ordinary way.

As hereinbefore remarked, the disk A, on the side opposite the cover, is of greater diameter than disk B, or the cover F. The periphery of this disk, formed, preferably, as shown in Fig. 4, in section, can be used as a braking-surface whenever the occasion requires—for instance, when a fish runs out. In this case the thumb can be readily pressed on the periphery of the disk, thus acting as a brake. In ordinary reels the thumb is pressed on the line on the reel, which line-surface is rough, causing objectionable burning of the thumb, and rapidly wearing out a thumb-stall, where one is used. With our reel no thumb-stall is required.

We have described the arrangement that we on the whole prefer; but it is obvious that various other arrangements may be adopted without departing from the principle of our invention. We do not limit ourselves therefore to the specific details herein described, as shown in illustration of our invention; but

What we claim, and desire to secure by Letters Patent, is—

1. The combination, with a rotary fishing-reel, of an eye or ring, independent of the reel proper, arranged by the side of and about on the prolongation of the axis of said reel, operating to lead the line over the side of the reel, and to deliver it freely without necessarily rotating the reel, substantially as and for the purposes set forth.

2. In a fishing-reel, a guide eye or ring, located at one side of, and about in line with, the axis of rotation of the reel proper, and provided with a lateral opening through which the line from the reel can enter and be withdrawn from said eye or ring, substantially as and for the purposes set forth.

3. The rotary reel, in combination with the said axially arranged guide eye or ring and cover in which said eye is contained, for joint operation, as set forth.

4. The combination, with the rotary reel proper, of the hinged cover, the central eye or ring contained by the same, and the line-passage extending from the circumference of the cover to the central eye or ring, substantially as set forth.

5. The cover, containing the eye or ring, and formed with a line opening or passage, as described, in combination with a slide or gate, movable to open and close the said passage, substantially as set forth.

6. The combination, with the hinged cover, central eye or ring, and sliding gate, closing the line-passage, as described, of the stationary inclined arm, encircled by a loop on the sliding gate, and operating to close or open the same, according as the cover is moved to or from the reel, substantially as set forth.

7. The line cover or case, in combination with the reel, formed with an outer disk of greater diameter than the case, whose periphery constitutes a braking-surface, substantially as shown and set forth.

8. The combination, with the butt of the pole, of the reel attached to the same, by a central spindle or shaft passing through and secured to the butt, substantially as shown and set forth.

In testimony whereof we have hereunto signed our names this 24th day of February, A. D. 1875.

THOMAS WINANS.
THOMAS D. WHISTLER.

Witnesses:
G. E. SANGSTON,
FERDINAND C. LATROBE.